United States Patent [19]

Kaeriyama

[11] Patent Number: 5,497,262
[45] Date of Patent: Mar. 5, 1996

[54] SUPPORT POSTS FOR MICRO-MECHANICAL DEVICES

[75] Inventor: Toshiyuki Kaeriyama, Plano, Tex.

[73] Assignee: Texas Instruments Incorporated, Dallas, Tex.

[21] Appl. No.: 476,961

[22] Filed: Jun. 7, 1995

Related U.S. Application Data

[62] Division of Ser. No. 283,486, Jul. 29, 1994.

[51] Int. Cl.$^6$ .................................................. G02B 26/08
[52] U.S. Cl. .......................... 359/223; 359/291; 359/900
[58] Field of Search ..................................... 359/212, 213, 359/221, 223, 224, 225, 230, 245, 259, 263, 267, 291, 295, 318, 846, 849, 850, 855, 871, 900; 345/33, 48, 108

[56] References Cited

U.S. PATENT DOCUMENTS 4,592,628  6/1986  Altman et al. ........................ 359/223
5,083,857  1/1992  Hornbeck ............................. 359/291

*Primary Examiner*—Paul M. Dzierzynski
*Assistant Examiner*—Darren E. Schuberg
*Attorney, Agent, or Firm*—Julie L. Reed; Richard L. Donaldson; Rene E. Grossman

[57] ABSTRACT

An improved support post (16, 23, 25) for micro-mechanical devices (10). A via (34a) that defines the outer surface of the support post (16) is etched into a spacer layer (34). An oxide layer (41) is conformally deposited over the spacer layer (34) and into the via (34a), and then etched back to the top surface of the spacer layer (34), leaving a sidewall ring (23a) on the inner surface of the via (34a). Next, a metal layer (61) is deposited over the spacer layer (34) and into the via (34a) so as to cover the sidewall ring (23a). This metal layer (61) is then etched to form a support post stem (23) inside the via (34a). The spacer layer (34) is removed, leaving the support post stem (23) and a sidewall ring (23a) around the stem (23).

7 Claims, 6 Drawing Sheets

SUPPORT POSTS FOR MICRO-MECHANICAL DEVICES

This is a division of application Ser. No. 08/283,486, filed Jul. 29, 1994.

TECHNICAL FIELD OF THE INVENTION

This invention relates to micro-mechanical devices, and more particularly, to an improved method of fabricating support posts for their movable elements.

BACKGROUND OF THE INVENTION

A recent development in the field of electro-mechanics has been the miniaturization of various mechanical devices. Typical of such devices are tiny gears, levers, and valves. These "micro-mechanical" devices are manufactured using integrated circuit techniques, often together with electrical control circuitry. Common applications include accelerometers, pressure sensors, and actuators. As another example, spatial light modulators can be configured from micro-mechanical pixels.

One type of micro-mechanical spatial light modulator is a digital micro-mirror device (DMD), sometimes referred to as a deformable mirror device. The DMD has an array of hundreds or thousands of tiny tilting mirrors. Light incident on the DMD is selectively reflected or not reflected from each mirror to an image plane, to form images. To permit the mirrors to tilt, each is attached to one or more hinges mounted on support posts, and spaced by means of an air gap over underlying control circuitry. The control circuitry provides electrostatic forces, which cause each mirror to selectively tilt.

DMDs have various designs, most of which include the fabrication of support posts to which the hinges are attached. Fabrication of the support posts has been accomplished with various approaches. One approach is to etch vias in a layer of spacer material. Metal is then deposited into the vias to coat each via's inner surface, resulting in a hollow metal post. A problem with this method is that it is difficult to uniformly coat the via's inner surface. In the terminology of silicon processing, good "step coverage" of the depositing material is difficult to achieve, and the coating inside the vias will typically have aberrations where the layer is very thin. Poor step coverage is an increasing problem as the aspect ratio of the vias increases. As a result, the support posts are mechanically weak.

SUMMARY OF THE INVENTION

One aspect of the invention is an improved micro-mechanical device of a type having support posts. The improvement is a support post having a support post stem, made from a stem material deposited into a via etched into a spacer layer that is subsequently removed. A sidewall ring surrounds the circumference of the stem, covering at least a portion of the inner surface or outer surface of the stem. The sidewall ring is made by depositing an oxide layer over the spacer layer and into the vias, then etching back the oxide layer to the top surface of the spacer layer.

In a first embodiment of the invention, the sidewall ring is made before deposition of the stem material. This provides the via with an inner profile that is rounded at the top edge of the via, slightly convex, and having an angle greater than 90 degrees at the bottom. This profile greatly enhances the step coverage of the subsequently applied metal layer that will form the support post stem.

An advantage of the invention is that it provides a stronger support post. When the sidewall rings are made before the stems, the sidewall rings improve the step coverage of the metal layer, in the sense that the thickness of the metal deposited on the inner surface of the vias is more uniform than with prior methods. The sidewall rings remain in place after fabrication, so as to bolster the strength of the metal walls.

DETAILED DESCRIPTION OF THE INVENTION

For purpose of example, the following description is in terms of a particular type of "digital micro-mirror device" (DMD), sometimes also referred to as a "deformable mirror device". As described in the Background, one application of DMDs is for forming images, where the DMD has an array of deflectable mirrors that selectively reflect light to an image plane. The images formed by the DMD can be used in display systems or for non-impact printing applications. Other applications of DMDs are possible that do not involve image formation, such as optical steering, optical switching, and accelerometers. In some of these applications, such as an accelerometer, the "mirror" need not be reflective and the applied force is due to acceleration rather than being electrostatic. Also, in some applications, the DMD is not necessarily operated in a digital mode.

In general, the term "DMD" is used herein to include any type of micro-mechanical device having at least one hinged and deflectable mass that is spaced by an air gap from a substrate, which it contacts in response to an applied force. The invention is used during fabrication of the DMD to provide support posts for the hinges, and in some DMD designs, for other elements that are spaced above the substrate.

Figure 1:
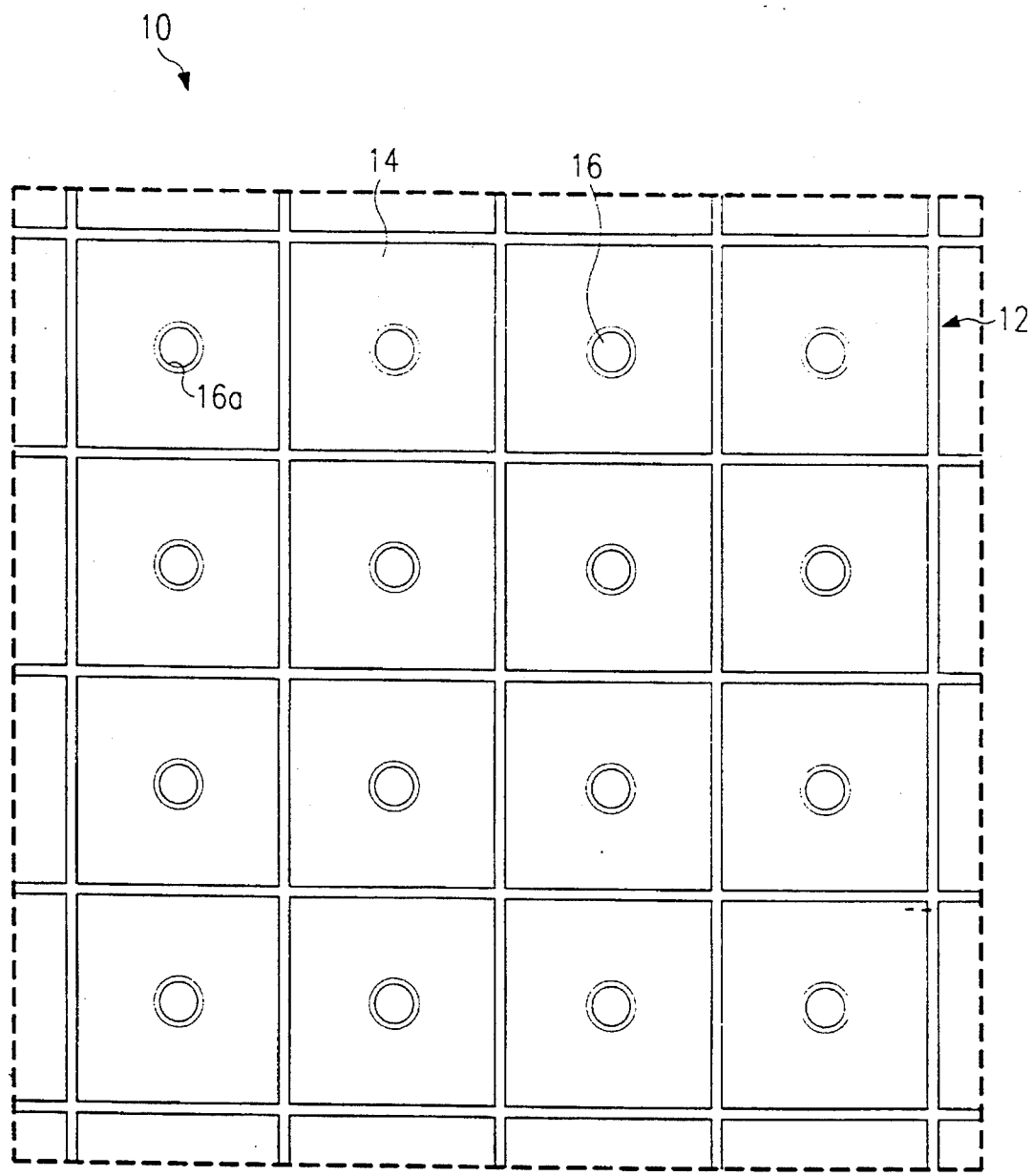
FIGS. 1 and 2 illustrate a digital micro-mirror device (DMD), made in accordance with the invention.

FIG. 1 is a plan view of a portion of a DMD 10 having an array of mirror elements 12. In the view of FIG. 1, only the mirror 14 and mirror support post 16 of each mirror element 12 are shown. In a typical DMD 10, the mirror elements 12 are fabricated on 17 micron centers.

Figure 2:
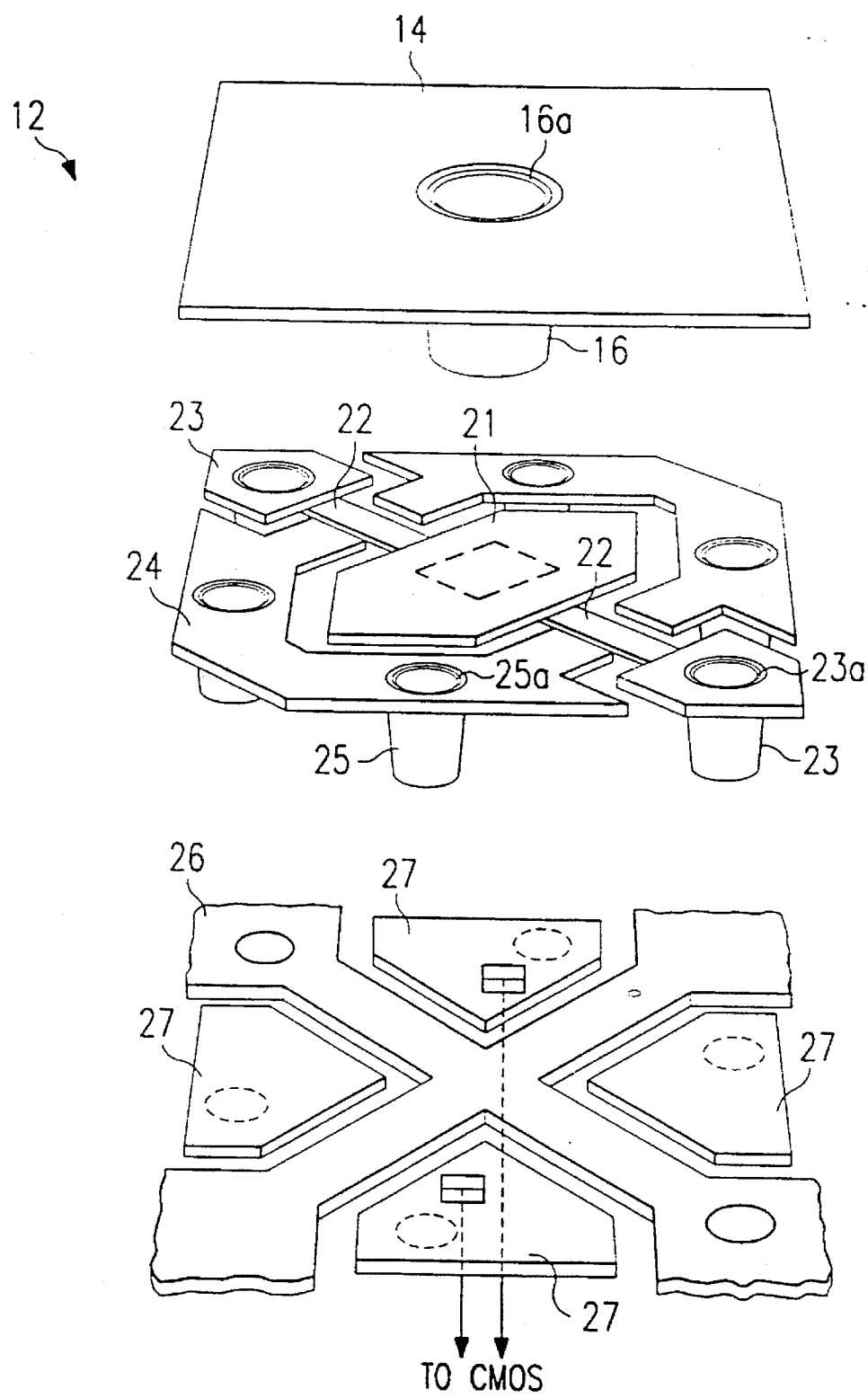
Figure 3:
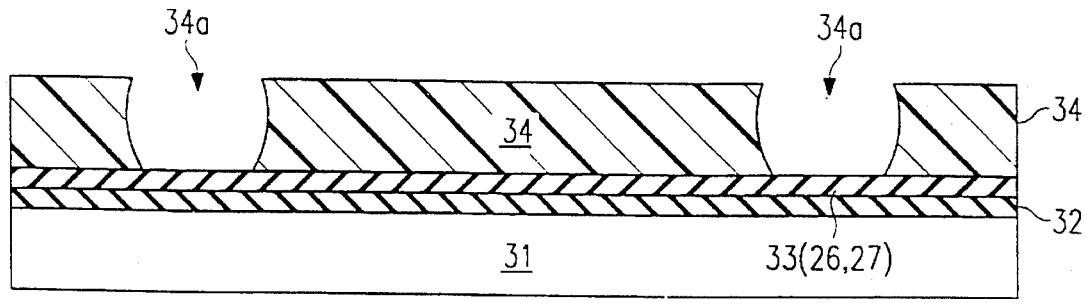
FIGS. 3–12 illustrate the steps of the method of the invention.

FIG. 2 is an exploded perspective view of a single mirror element 12. For purposes of example, the DMD 10 is a hidden-hinge type DMD. As with other DMD designs, the hinges 22 are supported on support posts 23. Additionally, address electrodes 24 are supported by electrode posts 25 on the same level as hinges 22 and hinge support posts 23. The mirrors 14 are fabricated above the hinge/electrode layer and are supported by mirror support posts 16.

Mirror support post 16 is fabricated over a landing yoke 21. Landing yoke 21 is attached to one end of each of two torsion hinges 22. The other end of each torsion hinge 22 is attached to a hinge support post 23. Address electrodes 24 are supported by electrode support posts 25. The hinge support posts 23 and electrode support posts 25 support the hinges 22, address electrodes 24, and landing yoke 21 over a control bus 26 and address pads 27. When mirror 14 is tilted, the tip of the landing yoke 21 contacts the control bus 26. The control bus 26 and landing pads 27 have appropriate electrical contacts with a substrate of address and control circuitry, which is typically fabricated within the substrate using CMOS fabrication techniques.

As explained below in connection with FIGS. 3–12, each hinge support post 23 is essentially a hollow stem 23b, made by depositing material into a via that has been etched in a spacer layer. In accordance with the invention, a sidewall ring 23a coats the inner surface of each stem 23b. The spacer layer is subsequently removed, leaving the stem 23b and the sidewall ring 23a. The address electrode support posts 25a and mirror support posts 16a may be made in the same way.

Another type of DMD for which the invention is useful is the torsion beam type, whose hinges are not hidden but rather extend from opposing sides of the mirror. Other types of DMDs are cantilever beam types and flexure beam types. Various DMD types are described in U.S. Pat. No. 4,662, 746, entitled "Spatial Light Modulator and Method"; U.S. Pat. No. 4,956,610, entitled "Spatial Light Modulator"; U.S. Pat. No. 5,061,049 entitled "Spatial Light Modulator and Method"; U.S. Pat. No. 5,083,857 entitled "Multi-level Deformable Mirror Device"; and U.S. patent application Ser. No. 08/171,303, entitled "Improved Multi-Level Digital Micromirror Device". Each of these patents is assigned to Texas Instruments Incorporated and each is incorporated herein by reference.

In operation for image display applications, a light source illuminates the surface of the DMD 10. A lens system may be used to shape the light to approximately the size of the array of mirror elements 12 and to direct this light toward them. The mirror support post 16 permits mirror 14 to rotate under control of hinge 22. Mirror 14 rotates in response to an electrostatic force caused by application of an appropriate voltage to an address electrode 24. When mirror 14 rotates, yoke 21 contacts bus 26.

Voltages based on data in the memory cells of the underlying CMOS circuit are applied to the two address electrodes 24, which are located under opposing corners of mirror 14. Electrostatic forces between the mirrors 14 and their address electrodes 24 are produced by selective application of voltages to the address electrodes 24. The electrostatic force causes each mirror 14 to tilt either about +10 degrees (on) or about −10 degrees (off), thereby modulating the light incident on the surface of the DMD. Light reflected from the "on" mirrors 14 is directed to an image plane, via display optics. Light from the "off" mirrors 14 is reflected away from the image plane. The resulting pattern forms an image. The proportion of time during each image frame that a mirror 14 is "on" determines shades of grey. Color can be added by means of a color wheel or by a three-DMD setup.

In effect, the mirror 14 and its address electrodes 24 form capacitors. When appropriate voltages are applied to a mirror 14 and its address electrodes 24, a resulting electrostatic force (attracting or repelling) causes the mirror 14 to tilt toward the attracting address electrode 24 or away from the repelling address electrode 24. The mirror 14 tilts until yoke 21 contacts bus 26.

Once the electrostatic force between the address electrodes 24 and the mirror 14 is removed, the energy stored in the hinge 22 provides a restoring force to return the mirror 14 to an undeflected position. Appropriate voltages may be applied to the mirror 14 or address electrodes 24 to aid in returning the mirror 14 to its undeflected position.

FIGS. 3–12 illustrate the method aspects of the invention, which may be used to form any of the support posts 16, 23, or 25, for mirrors 14, hinges 22, or address electrodes 24, respectively. For purposes of example, the method of the invention is described in terms of fabricating mirror elements 12 of a hidden-hinge DMD 10 of the type described above. Except for the fabrication of support posts 16, 23, and 25, further details of fabrication of a DMD of this type are set out in U.S. patent application Ser. No. 08/171,303 referred to above. With appropriate modifications, the method could be performed for fabrication of other types of DMDs, or for other types of micro-mechanical devices having support posts.

Regardless of the type of micro-mechanical device on which the method of FIGS. 3–12 is performed, the method assumes that the underlying address and control circuitry has been fabricated. This circuitry is shown as CMOS substrate 31. Substrate 31 is covered with a protective oxide layer 32. A metal layer 33 is then deposited, from which control bus 26 and landing address pads 27 are patterned and etched. Although not shown in the view of FIG. 3, in appropriate locations, holes are opened in the oxide layer 32 to permit the metal of layer 33 to contact the CMOS substrate 31.

A hinge spacer layer 34 is then deposited, yielding a planar surface upon which to fabricate yoke 21 and hinges 22. The spacer layer 34 is patterned and etched to form vias 34a, which define the hinge support posts 23. Typically, vias 34a are round and define substantially cylindrical support posts 23, but other shapes could equivalently be used. In the view of FIGS. 3–12, vias for the address electrode support posts 24 are not visible, but could be made with the same method as described herein to make hinge support posts 23. The thickness of layer 34 determines the size of the air gap under landing yoke 21, which in turn, determines the rotation angle of mirror 14. A typical spacer layer 34 is approximately 20,000 angstroms thick and is comprised of positive photoresist that is UV hardened.

Figure 4:
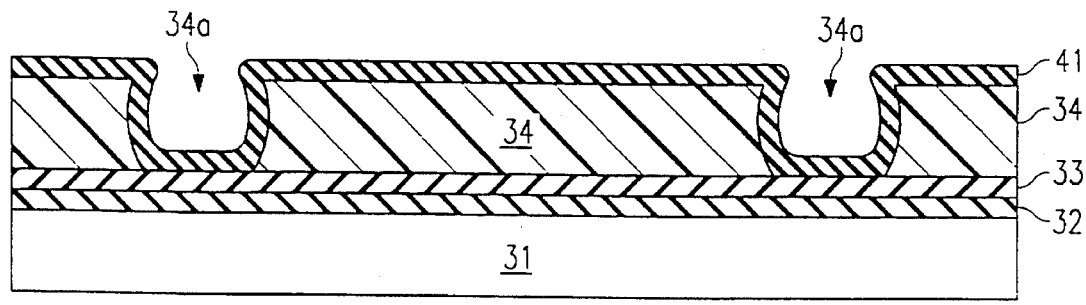

In FIG. 4, a layer 41 of sidewall oxide has been deposited over layer 34 and into vias 34a. Layer 41 is as conformal as possible. A typical thickness of layer 41 is 3000 angstroms. A suitable deposition technique involves the use of a fluorotriethoxysilane liquid source at room temperature. This source is described in an article entitled "Fluorinated Interlayer Dielectric Films in ULSI Multilevel Interconnections", by Tetsuya Homma, for E-MRS Spring Meeting 1994, Symposium A: Amorphous Insulating Thin Films II. Other oxide deposition methods, such as by decomposing tetramethyl siloxane (TMDS) at 120 degrees centigrade at 10 angstroms per second, or by trimethoxy 2 at 170 degrees centigrade at 2.7 angstroms per second, have been used with satisfactory results.

Figure 5:
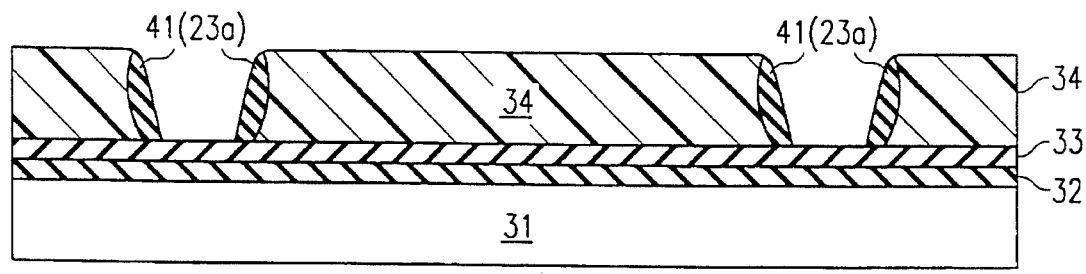

In FIG. 5, an anisotropic etch has been performed on layer 41, so as to leave a sidewall ring 23a on the inner surface of the via 34a. This etch, which etches away the oxide to the top surface of spacer layer 34, is referred to herein as an "etch back". Comparing FIG. 3 to FIG. 5, the profile of via 34a with the addition of sidewall ring 23a is no longer overhanging at the top and bowed in at the sides. Instead, the profile of via 34a is slightly rounded at its top edge and slightly convex down its sides. The angle at the bottom of via 34 is at least 90 degrees, which avoids a cusping problem at the bottom of the via 34a. With these characteristics, the addition of sidewall ring 23a results in a better profile for purposes of subsequent deposition of the metal layer for the support post stem 23b.

Figure 6:
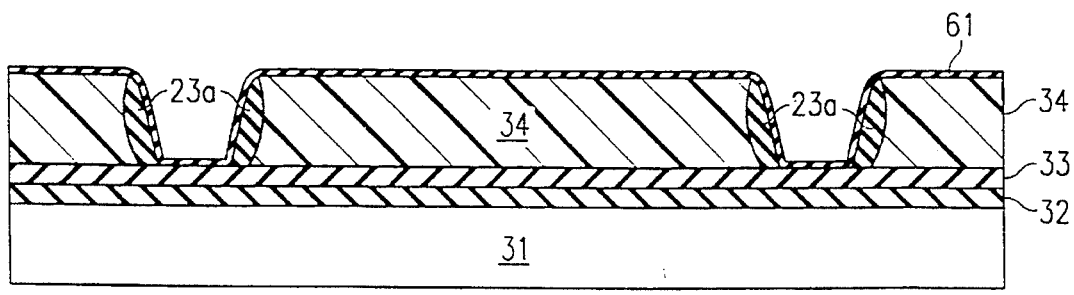

In FIG. 6, a post metal layer 61 has been deposited over spacer layer 34 and into vias 34a. Layer 61 is referred to as a "post" metal layer although it may be used to form other elements, and in the example of this description, is used to form hinges 22 as well as hinge support posts 23. In particular, layer 61 forms the stem 23b of post 23. Layer 61 is approximately 600 angstroms thick. A typical material for post metal layer 61 is an aluminum alloy. A typical deposition means is sputtering.

Because of the improved profile of via 34a with sidewall ring 23a, the deposition of layer 61 results in more uniform step coverage than would have occurred if the deposition were into via 34a without sidewall ring 23a. The thickness of the deposited layer near the top of via 34a is nearly the same as the thickness on the top surface of spacer layer 34. At the bottom of the via 34a, cusping is minimized. In other words, the inner profile of the support post 23, now defined by sidewall ring 23a and stem 23b, corresponds to the profile of the via with sidewall ring 23a as discussed above. The profile is rounded at the top, slightly convex, and greater than 90 degrees at the bottom.

Figure 7:
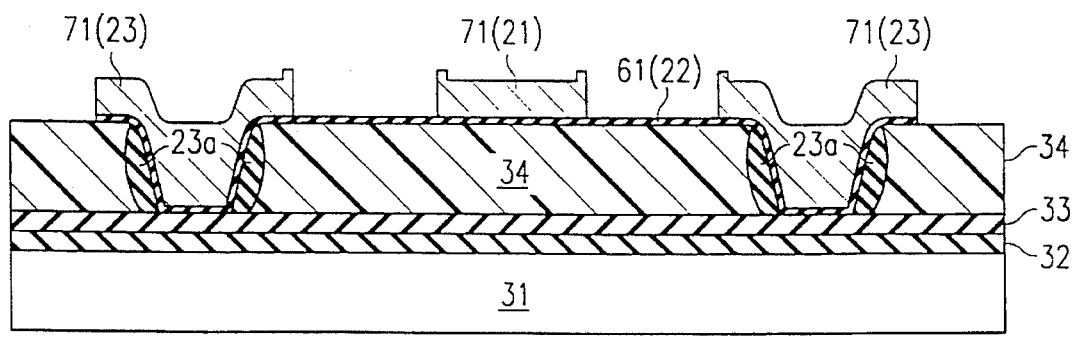

FIG. 7 illustrates the results of the etching steps for hinges 22 and yoke 21. A second metal layer 71 has been deposited over layer 61. Layer 71 is typically about 3000 angstroms thick. Like layer 61, a typical material is an aluminum alloy. A plasma etch is used to pattern the hinges 22, electrodes 24 (not shown in FIG. 7), tops of support posts 23, and yoke 21. Although not shown in FIG. 7, oxide layers act as etch stops and protect the metal beneath them. After completion of the plasma etch, the oxide etch stops are removed.

Figure 8:
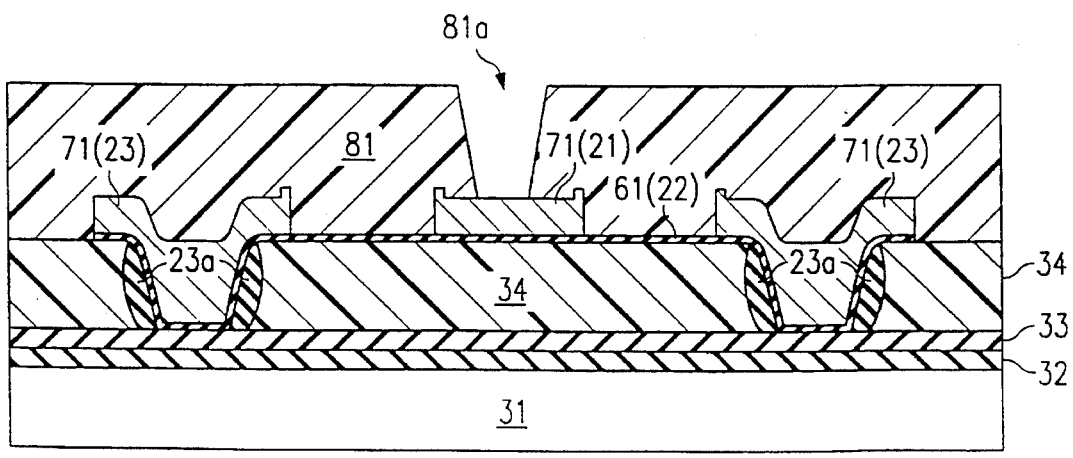

In FIG. 8, a mirror spacer layer 81 has been deposited over yoke 21, hinges 22, and electrodes 24 and patterned with vias 81a that define mirror support posts 16. A typical thickness of spacer layer 81 is 2.2 micrometers. It is UV hardened at a temperature of approximately 180 degrees centigrade.

Figure 9:
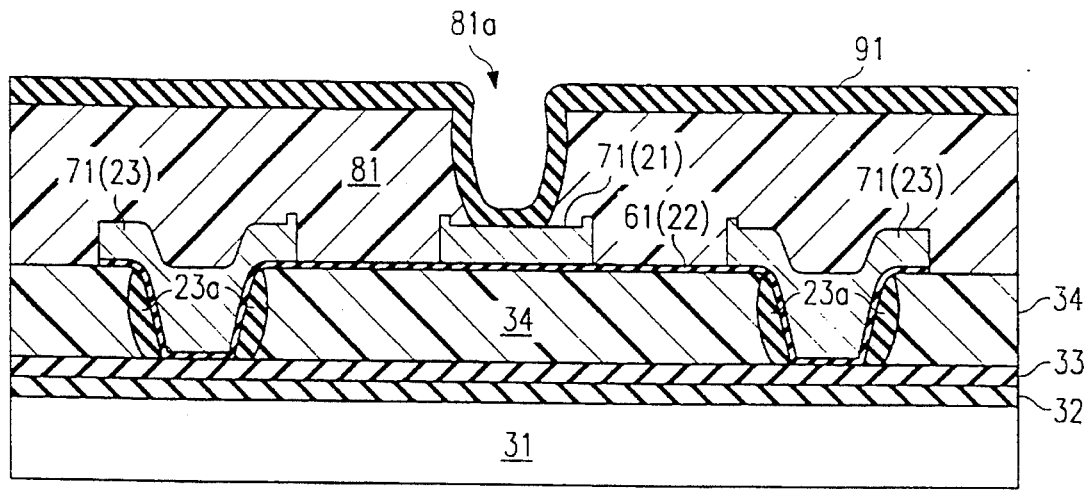
Figure 10:
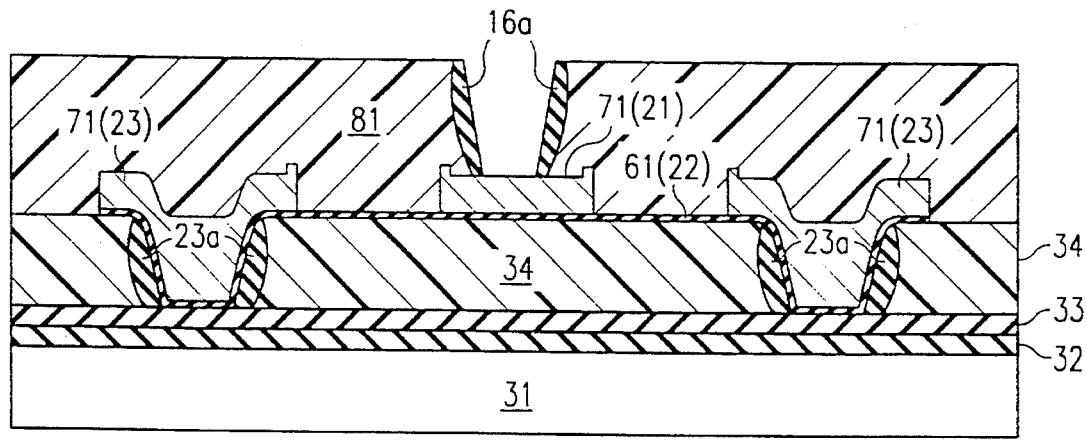

In FIGS. 9 and 10, a sidewall ring 16a for mirror support post 16 has been formed around via 81a. This sidewall ring 16a is formed in a manner similar to that described above for the sidewall ring 23a for the hinge support posts 23. More specifically, an oxide layer 91 is conformally deposited and etched back.

Figure 11:
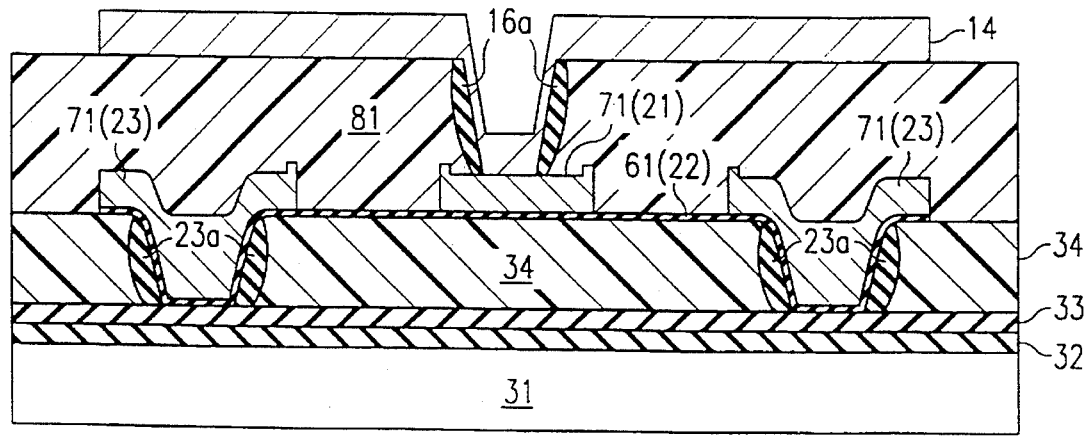

In FIG. 11, a mirror layer 111 has been deposited and patterned to form mirrors 14 and mirror support posts 16. A typical thickness of this layer 111 is 4250 angstroms. A typical material for layer 111 is an aluminum alloy. To form the mirrors, a masking oxide layer is deposited, then patterned, and etched with layer 111. This layer is left in place while the wafer is coated with a protective coating, sawed into chip arrays, and cleaned.

Figure 12:
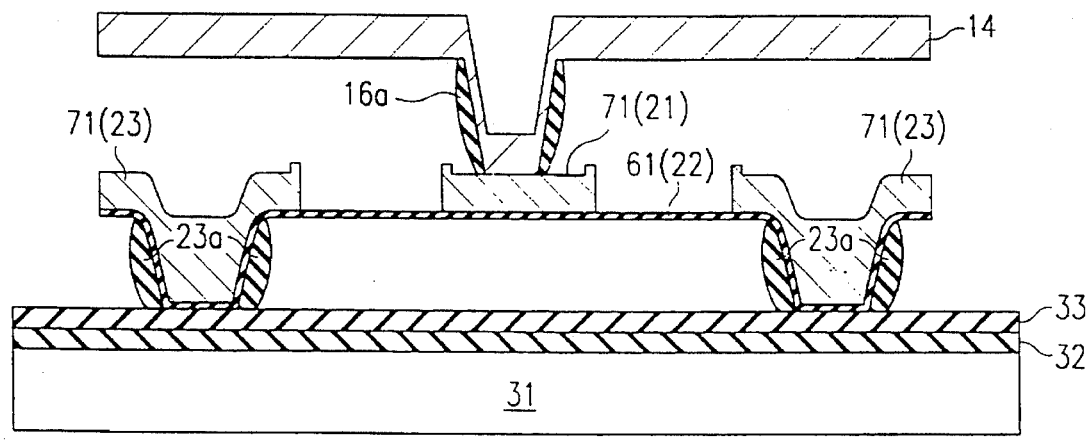

In FIG. 12, the chips of FIG. 11 are etched so as to remove spacer layers 34 and 81. This leaves an air gap under hinges 22 and yoke 21 and under mirror 14.

Figure 13:
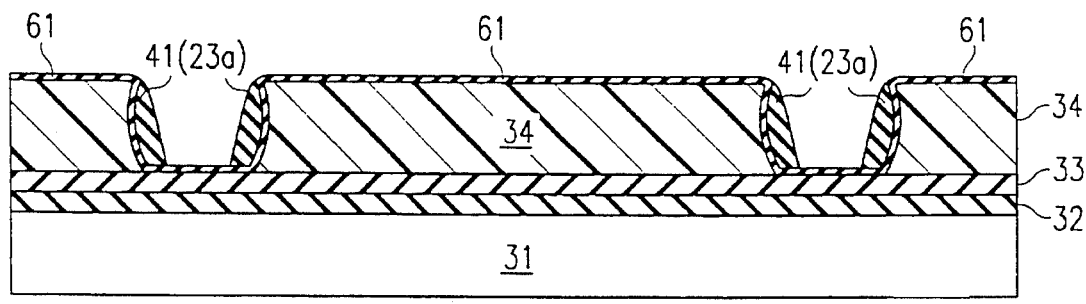
FIG. 13 illustrates an alternative embodiment of the invention.

FIG. 13 illustrates an alternative to the above-described method, in which hinge metal layer 61 is deposited before the sidewall oxide layer 41. Otherwise, the sidewall rings 23a are fabricated in the same manner. The subsequent processing is the same as shown in FIGS. 6–12. An advantage of this alternative is that the metal layer 61 protects the sidewall rings 23a during removal of the spacer layer 34. The sidewall rings 23a remain in place to support the stem 23b of support post 23.

Figure 14:
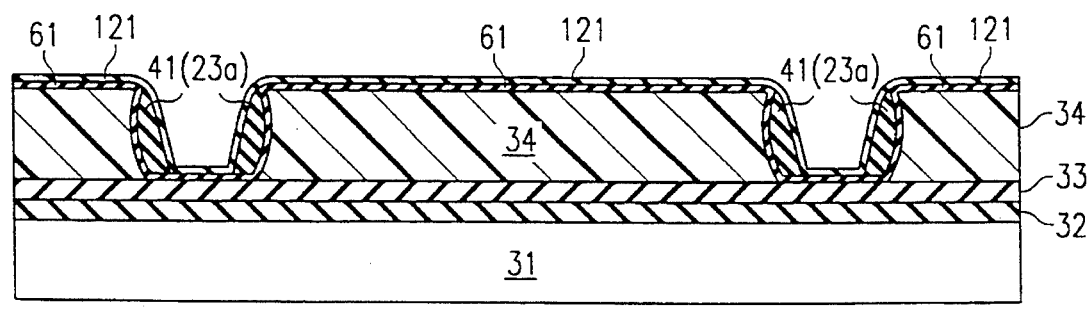
FIG. 14 illustrates a second alternative embodiment of the invention.

FIG. 14 illustrates a further alternative to the above described method, in which two metal layers 61a and 61b are deposited. One is deposited under sidewall layer 41 as in FIG. 13. The other is deposited sidewall ring 23a as in FIG. 6. Either or both layers 61a or 61b may be used to form hinges 22 and yoke 21.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An improved method of fabricating support posts for a micro-mechanical device, wherein the improvement comprises:

depositing a spacer layer over a substrate;

etching vias into said spacer layer, each via defining the outer surface of a support post;

depositing an oxide layer over said spacer layer and into said vias, such that said oxide layer substantially conformally coats the inside surface of said vias;

etching back said oxide layer to the top surface of said spacer layer, such that a sidewall ring remaining from said oxide layer coats the inside surfaces of each via;

depositing a post metal layer over said spacer layer, such that said post metal layer coats the inside surface of said sidewall rings; and etching said post metal layer to form said support posts.

2. The method of claim 1, wherein said step of depositing an oxide layer is performed at room temperature.

3. The method of claim 1, wherein said step of depositing an oxide layer is performed at a temperature between room temperature and 120 degrees.

4. The method of claim 1, wherein said step of depositing an oxide layer is performed by depositing oxide by means of a fluorotriethoxysilane source.

5. The method of claim 1, wherein said depositing step is performed by depositing oxide by means of a tetramethyl siloxane (TMDS) source.

6. The method of claim 1, wherein said step of etching back is performed with an anisotropic etch.

7. The method of claim 1, wherein said step of depositing a post metal layer is performed by sputtering.

* * * * *